Patented May 18, 1937

2,081,117

UNITED STATES PATENT OFFICE 2,081,117

ANTISUNBURN PREPARATIONS

Robert A. Hall, Brooklyn, N. Y., assignor to Colgate-Palmolive-Peet Company, Jersey City, N. J., a corporation of Delaware No Drawing. Substitute of application Serial No. 726,296, May 18, 1934. This application February 18, 1936, Serial No. 64,599

8 Claims. (Cl. 167—90)

This invention relates to new anti-sunburn preparations which are valuable for protecting the skin against sunburn, and also for treating skin which has been sunburned, and which have other desirable properties, such as those hereinafter described. The new anti-sunburn preparations are characterized by containing an ester of salicylic acid with a polyhydric alcohol, such as the glycerin ester of salicylic acid.

This application is a substitute for my prior application Serial No. 726,296 filed May 18, 1934.

The new anti-sunburn preparations contain the ester of salicylic acid with a polyhydric alcohol compounded with other ingredients which give to the composition suitable properties for application to the skin, e. g. in the form of lotions, cold creams, etc.

Among the alcohols which may be combined with salicylic acid to form the esters used in the new anti-sunburn preparations are included such polyhydric alcohols as glycerin, glycol, di-ethylene glycol and its monoethyl ether, ethylene glycol and its monoethyl ether, etc. When polyhydric alcohols, such as glycerin, are combined with the salicylic acid, only part of the hydroxyl groups of the polyhydric alcohol are combined with the salicylic acid, leaving part of the hydroxyl groups free or combined with an alkyl group. The esters of salicylic acid with polyhydric alcohols in which there is a free hydroxyl group are particularly advantageous, since the presence of the free hydroxyl group appears to promote absorption of the salicylic acid ester by the skin. In the case of the monosalicylic acid ester of glycerin, there are two free hydroxyl groups and the compound is fat soluble, and also has pronounced hydrophile properties, which promote its compounding and use and absorption in anti-sunburn preparations.

The new anti-sunburn preparations, containing salicylic acid combined with a polyhydric alcohol in the form of an ester, are free from pronounced acid or alkaline properties, such as would be injurious to the skin, and they serve to protect the skin not only from sunburn but also from infection, due to their antiseptic properties. In addition, they have the further advantage of alleviating the pain resulting from sunburn, so that they are advantageously used in treating skin which has been sunburned, as well as in protecting the skin from further sunburn. The preparations have the further advantage of relieving or alleviating pain due to other causes, such as bruises, bites, burns, wounds, etc. The compositions have the further advantage of softening the hair when applied to the scalp or head.

The anti-sunburn preparations of the invention will be illustrated by the following examples, but the invention is not limited thereto.

A typical anti-sunburn lotion may be made, for example, by first compounding the following ingredients in the following proportions

| | Parts by weight |
|---|---|
| Stearic acid | 1 to 3 |
| Lanolin | 1 to 3 |
| Beeswax | 1 to 3 |
| Glyceryl monosalicylate | 20 to 25 | by separately compounding about 0.75 part by weight of triethanolamine with an amount of water which will make, with the other ingredients, 100 parts by weight, by separately heating the two compounds thus prepared to around 185 to 190° F. and then adding the first preparation to the second, with agitation, while maintaining the temperature, and then, after thorough compounding, permitting the composition to cool with continued slow agitation until the temperature drops to around 140° F., at which point a suitable perfume is added and agitation continued until the finished lotion reaches room temperature.

An anti-sunburn cream may be similarly compounded of the following ingredients, using first a composition containing the following materials in the following proportions

| | Parts by weight |
|---|---|
| Stearic acid | 16 to 18 |
| Lecithin | 1 to 2 |
| Lanolin | 3 to 4 |
| Glyceryl monosalicylate | 15 to 20 | by heating this composition to around 185 to 190° F., and adding it to water containing 0.5 to 1 part by weight of triethanolamine, using enough water to make up 100 parts of the total composition, the water and triethanolamine being heated to a similar temperature, and the two mixtures being combined in the manner described above in connection with the lotion formula.

An oil-type anti-sunburn composition may be compounded of the following ingredients in the following proportions

| | Parts by weight |
|---|---|
| Glycerin monosalicylate | 20 to 25 |
| Mineral oil (liquid) | 70 to 75 |

To the mixture of these ingredients may be added a suitable coloring material and perfume, and with intermixture and blending of the whole to a uniform composition. The glycerin monosalicylate and mineral oil are thoroughly mixed before the coloring matter and perfume are added.

An alcoholic type composition may be compounded by adding 10 to 25 parts by weight of glycerol monosalicylate to sufficient alcohol to make 100 parts by weight, with the addition of suitable perfume and coloring matter. The alcohol employed may be of suitable composition, for example, 50% ethyl alcohol, that is, about equal parts of ethyl alcohol and water.

The use of glyceryl monosalicylate in such preparations is particularly advantageous inasmuch as the glyceryl radical contains 2 free hydroxyl groups which appear desirable in promoting absorption of the preparation by the skin, and protection of the skin and alleviation of pain, etc.

In a similar manner other esters of salicylic acid with other polyhydric alcohols, such as those above mentioned, can be similarly used, for example, glycol monosalicylate, and the salicylic acid esters of etherified polyhydric alcohols, such as ethylene glycol monoethyl ether, diethylene glycol monoethyl ether, etc. When etherified polyhydric alcohols are used, the resulting salicylic acid ester will be a combined ester and ether of the polyhydric alcohols.

The esters of salicylic acid with polyhydric alcohols used in accordance with the present invention, may be prepared in any convenient manner, such as by the esterification of salicylic acid with a polyhydric alcohol such as glycerin, or by reaction between the methyl ester of salicylic acid and a polyhydric alcohol. The esters may be used either in a purified form or in a relatively crude form, as long as they do not contain deleterious impurities. For example, if the glyceryl ester of salicylic acid is used, and if in the production of this ester an excess of glycerin is used, so that free glycerin is left in the product, it is not necessary to remove this glycerin as its presence in the anti-sunburn preparations is unobjectionable and the product containing the excess glycerin is well adapted for use with other constituents for the anti-sunburn preparations.

I claim:

1. An anti-sunburn preparation containing a substantial amount, effective to prevent sunburn, of an ester of salicylic acid with a polyhydric alcohol.

2. An anti-sunburn preparation containing a substantial amount, effective to prevent sunburn, of an ester of salicylic acid with a polyhydric alcohol, which ester is a monosalicylate having free hydroxyl groups on both the alcohol and the salicyl radicals.

3. An anti-sunburn composition containing a substantial amount, effective to prevent sunburn, of glycerin monosalicylate.

4. An anti-sunburn preparation in the form of a lotion containing a substantial amount, effective to prevent sunburn, of glycerol monosalicylate in the form of an aqueous emulsion containing other lotion constituents.

5. An anti-sunburn composition in the form of a cream containing a substantial amount, effective to prevent sunburn, of glycerol monosalicylate emulsified with water and other cream constituents.

6. An anti-sunburn composition comprising a mineral oil compounded with a substantial amount, effective to prevent sunburn, of glycerol monosalicylate.

7. An anti-sunburn preparation containing a substantial amount, effective to prevent sunburn, of glycerin salicylate.

8. An anti-sunburn preparation containing a substantial amount, effective to prevent sunburn, of glycol salicylate.

ROBERT A. HALL.